United States Patent

[11] 3,570,356

[72] Inventors Arthur L. Williams;
 Francis A. Bodenheim, Warren, Ohio
[21] Appl. No. 724,904
[22] Filed Apr. 29, 1968
[45] Patented Mar. 16, 1971
[73] Assignee Wean Industries, Inc.

[54] STRIP NOTCHING APPARATUS
 1 Claim, 11 Drawing Figs.
[52] U.S. Cl. .................................................. 83/693,
 29/481, 83/516, 83/560, 83/914, 83/917, 219/97
[51] Int. Cl. ...................................................... B26d 1/08
[50] Field of Search........................................... 83/368,
 516, 517, 914, 917, 693, 560, 513; 219/97, 101;
 29/480, 481, 476, 18, 482

[56] References Cited
UNITED STATES PATENTS
| 2,163,641 | 6/1939 | Wales.......................... | 83/560X |
| 2,374,376 | 4/1945 | Olney.......................... | 83/560 |
| 2,582,094 | 1/1952 | Balsam et al................ | 83/560 |
| 3,485,131 | 12/1969 | Brolund...................... | 83/516X |
| 2,177,356 | 10/1939 | Stone et al. ................ | 83/368X |
| 2,975,265 | 3/1961 | Kaiser et al. ................ | 83/914X |
| 3,227,851 | 1/1966 | Greenberger ............... | 219/97 |

Primary Examiner—Frank T. Yost
Attorney—Williams and Kreske

ABSTRACT: Apparatus for use in a processing line through which strip travels longitudinally, such apparatus functioning to join the trailing end of a first strip portion to the leading end of a second strip portion along a transverse line of juncture to form a continuous strip length. The apparatus includes a flash-welder for joining the first and second strip portions, a trimmer for removing the weld flash from opposite faces of the strip at the line of juncture, a notcher for removing weld flash at the line of juncture at opposite side edges of the strip and including means for removing the abrupt shoulder formed at the line of juncture at at least one side edge of the strip when a relatively narrow first strip portion is welded to a relatively wide second strip portion. The apparatus also includes punch means selectively operable with the notcher to pierce the strip adjacent the line of juncture to facilitate identification of the latter during subsequent processing of the strip. The apparatus further includes means for locating the notcher in predetermined operational relation with the side edge aforesaid of the first strip portion.

Patented March 16, 1971
3,570,356
3 Sheets-Sheet 1
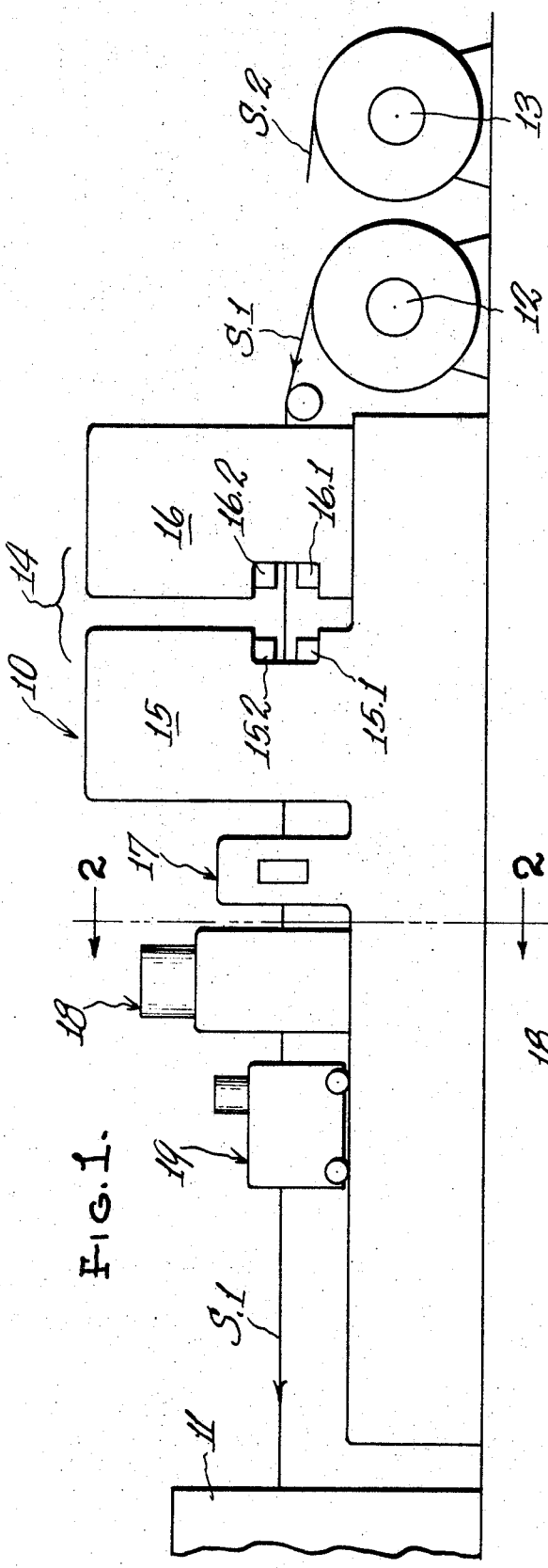
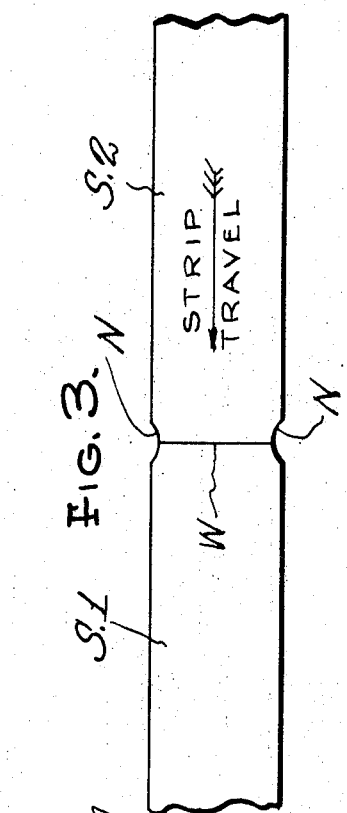
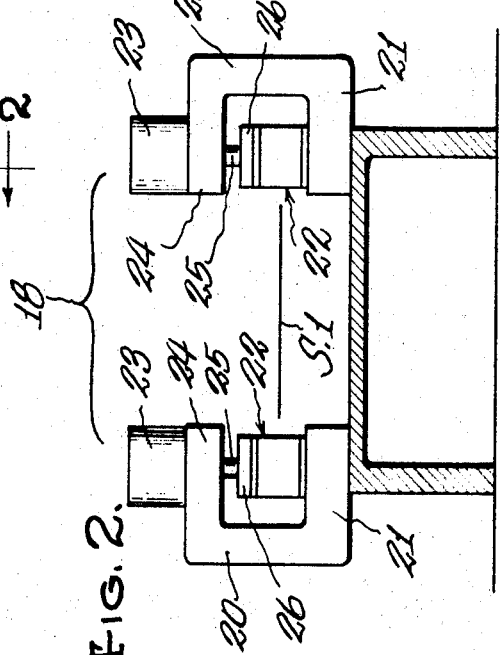
INVENTORS
ARTHUR L. WILLIAMS
and FRANCIS A. BODENHEIM
BY Williams and Krecke
ATTORNEYS Patented March 16, 1971
3,570,356
3 Sheets-Sheet 2
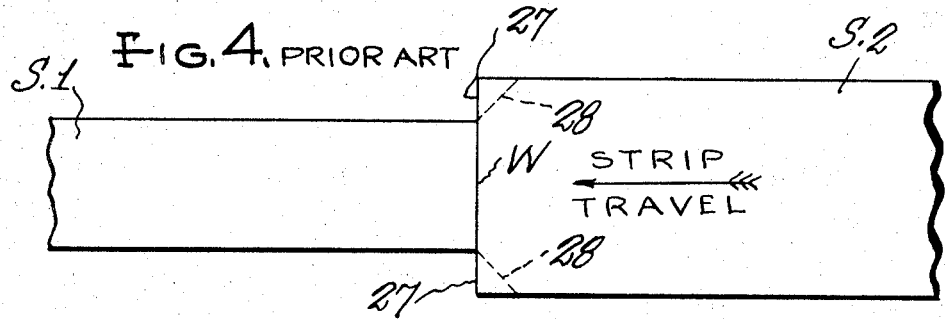
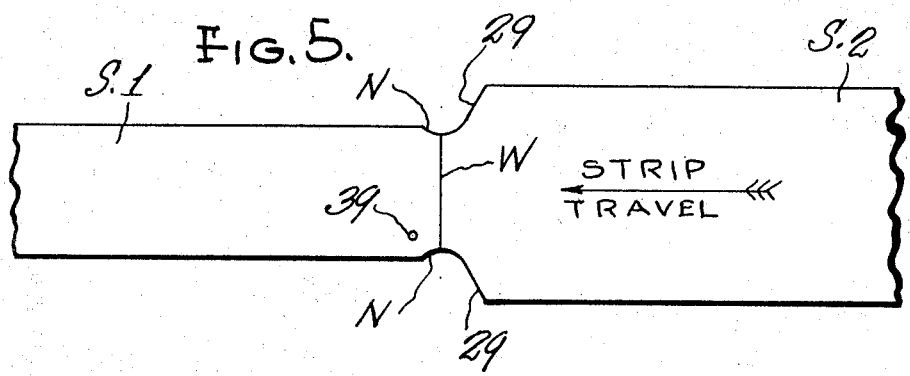
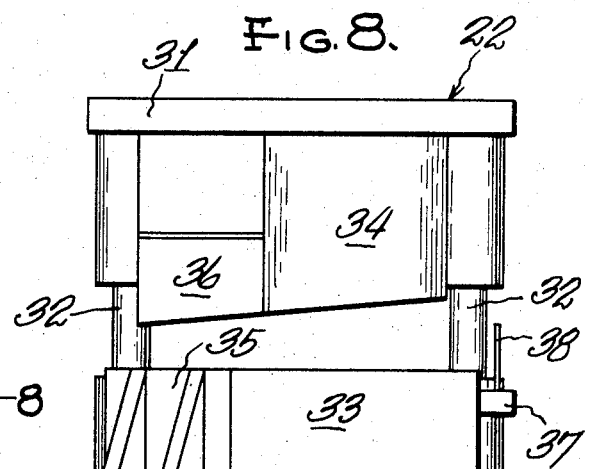
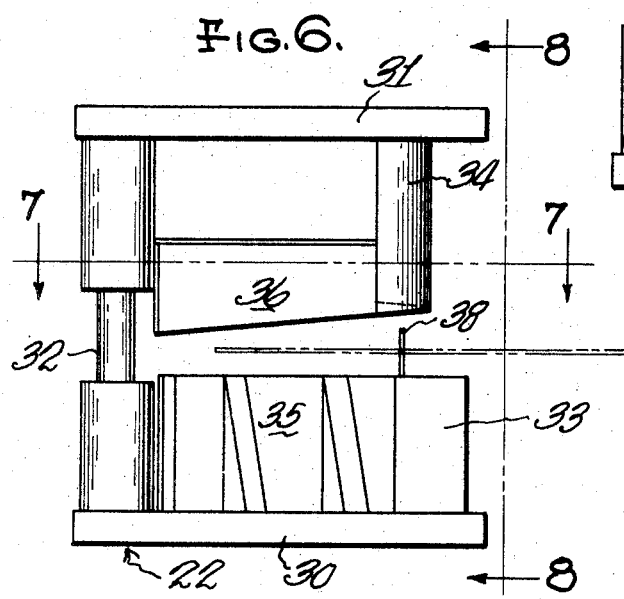
INVENTORS
ARTHUR L. WILLIAMS
and FRANCIS A. BODENHEIM
By Williams and Kruke
ATTORNEYS

Patented March 16, 1971

INVENTORS
ARTHUR L. WILLIAMS
and FRANCIS A. BODENHEIM

By *Williams and Kreske*
ATTORNEYS

3,570,356

STRIP NOTCHING APPARATUS

BACKGROUND

Welding apparatus has long been used to weld the trailing end of a first strip to the leading end of a second strip along a transverse line of juncture to form a continuous strip length which may be drawn longitudinally through a strip processing line. Since many welding operations thicken the strip at the line of strip juncture as well as increase its width thereat, it has been common practise to trim the strip faces at the line of strip juncture to eliminate such thickening and to notch opposed strip side edges at such line of strip juncture to eliminate such widening.

While prior art apparatus has been satisfactory where the strip portion secured together are the same width or where the trailing end of a first strip portion is wider than the leading end of the second strip portion, difficulties arise where the trailing end of the first strip portion is narrower than the leading end of the second strip portion. This difficulty results from the abrupt shoulder formed at least one side edge of the strip at the line of strip juncture, which shoulder faces in the direction of strip travel and thus can catch upon a side guide or other obstruction in the processing line.

To obviate the foregoing difficulties, the present invention not only provides means for notching the strip at its line of juncture, it also includes means for removing the hereinabove mentioned abrupt shoulder in the strip. This and other advantages will readily become apparent from a study of the description which follows and from the appended drawings.

SUMMARY

Apparatus for joining the trailing end of a relatively narrow first strip portion to the leading end of a relatively wide second strip portion to form a longitudinally traveling, continuous strip length which widens at the line of strip juncture thus forming an abrupt shoulder at at least one strip side edge which faces the normal direction of strip travel. A cutting device is disposed adjacent the strip side edge aforesaid and has generally rectilinear, cooperable blade portions disposed at an angle to the longitudinal axis of the strip. Such blade portions are of a length to extend from the first strip one side edge adjacent its intersection with the line of strip juncture to the second strip one side edge for purpose of removing from the strip, the previously mentioned abrupt strip shoulder.

In one embodiment of the invention, the cutting device includes punch means for piercing the strip to facilitate identification of the location of the line of strip juncture and such punch means, while normally operable with the cutting device during an operational cycle of the latter, includes means for selectively rendering the punch means inoperative during a cutting device operating cycle.

DRAWING DESCRIPTION

In the drawings accompanying this specification and forming a part of this disclosure, there is shown, for purpose of illustration, embodiments which the invention may assume, and in these drawings:

FIG. 1 is a side elevational view of apparatus embodying a preferred form of the invention, FIG. 2 is a transverse sectional view generally corresponding to the line 2–2 of FIG. 1, FIG. 3 is a top plan view of equal width strip portions as joined together by the instant invention, FIG. 4 is a top plan view of unequal width strip portions as joined together by prior art apparatus, FIG. 5 is a view like FIG. 4 but showing the same strip portions as joined together by the present invention, FIG. 6 is an enlarged fragmentary view similar to FIG. 2, FIG. 7 is a sectional view generally corresponding to the line 7–7 of FIG. 6, FIG. 8 is an elevational view generally corresponding to the line 8–8 of FIG. 6, FIG. 9 is a view similar to FIG. 8 but of another embodiment, FIG. 10 is a top plan view of the embodiment seen in FIG. 9, and FIG. 11 is a view similar to that of FIG. 5 but showing the joinder of unequal width strip portions by the present invention with a side edge of respective strip portions in alignment with each other.

DETAILED DESCRIPTION

Figure 7:
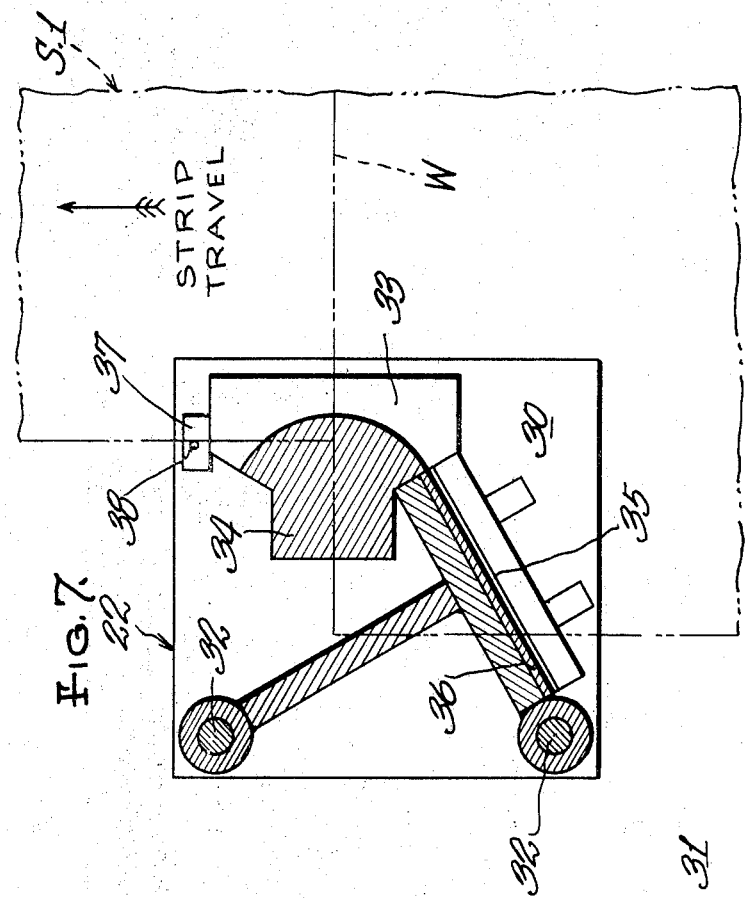

With reference to FIG. 1, there is shown strip-joining apparatus generally indicated by the reference character 10 which is positioned at the entry end of a strip-processing line 11 of the type to which strip is to be fed is a continuous length. Apparatus 10 is herein shown to comprise a pair of strip payoff reels 12 and 13, a flashwelder 14 having a fixed head 15 and a movable head 16, a trimmer 17, notcher means 18, and a strip transfer carriage 19. The fixed welder head 15 has opposed jaws 15.1, 15.2 for gripping strip disposed therebetween while the movable welder head 16 has similar jaws 16.1, 16.2. Although not shown, the trimmer 17 may also have strip gripping jaws as will the strip transfer carriage 19.

As viewed in FIG. 2, notcher means 18 comprises mirror image assemblies disposed on respective sides of the strip adjacent its side edges. Each notcher assembly is show to be formed similar to a C-frame press with a C-frame 20 having a bottom leg 21 to which is secured a die set 22 having suitable cutting dies. A fluid cylinder 23 is secured to the upper arm 24 of the frame 20 and its piston rod 25 forms the press ram which bears against the upper plate of the die set 22 via a platen 26. Normally, the notcher assemblies are disposed outboard of the widest strip to be handled; however, such assemblies are mounted for movement by any convenient means toward operable engagement with respective side edges of the strip as will appear.

Assuming that strip S.1 coiled on the payoff reel 10 has been passed between the open jaws of the welder 14, through the trimmer 17, between the spaced assemblies of the notcher means 18, and through the carriage 19 to the line 11, operation will be as follows: Strip will be drawn longitudinally into the line 11 from the reel 12 until all of the strip has been unwound. The trailing end of strip S.1 will then be gripped between the welder jaws 15.1, 15.2 in proper welding position. Although it forms no part of the present invention, a suitable shear (not shown) may be employed to square off the trailing strip end and any conventional device may be employed to insure that the trailing end of strip S.1 is gripped by the jaws 15.1, 15.2 in proper welding position.

The leading end of a strip S.2 from a coil on reel 13 will now be fed between and gripped by the welder jaws 16.1, 16.2 in proper welding position. Here again the leading strip end may be squared off by a suitable shear which has not been shown since it forms no part of the invention. Since welder 14 is disclosed as being a flashwelder, the initial position of the gripped strip ends is with the latter spaced apart in a direction longitudinally of the strip. With the trailing strip end S.1 gripped by the welder head 16 as above described, welding current will be caused to arc between the adjoining strip ends while the head 16 is advanced toward the head 15 in a conventional flash welding cycle.

When the strip ends have been welded together, the jaws of carriage 19 will close upon the strip and the welder jaws 15.1, 15.2, 16.1 and 16.2 will open. Carriage 19 will next be shifted to the left an amount to advance the line of juncture between the strips S.1, S.2 to the trimmer 17 whereupon the latter will function to trim the upset metal at the line of strip juncture, caused by the welding operation from opposite strip faces.

Carriage 19 will next advance the strip to alignment of its line of strip juncture with the notcher means 18 whereupon the separate assemblies thereof (FIG. 2) will move toward each other to operable relation with respective side edges of the strip and the dies thereof will be actuated to remove upset metal caused by the welding operation from opposite side edges of the strip.

With flash, or upset metal, removed both from opposed faces of the strip and opposed side edges thereof, the strip will be released by the carriage 19 for resumption of travel longitudinally into the line 11 but from the coil on reel 13. The notcher assemblies, of course, will be separated to their starting positions and a new coil of strip will be disposed on the reel 12 to await joinder of its leading end with the trailing end of strip S.2 when the latter has been unwound from the reel 13.

The construction thus far described and the disclosed sequence of operation is well known and, FIG. 3 illustrates equal width, joined together strip ends S.1 and S.2 with the line of strip juncture indicated by the reference character W and with the notched side edge portions of the strip indicated by the reference character N. When equal width strip ends are secured together in substantial alignment as seen in FIG. 3, prior art apparatus and the improved apparatus later to be described are equivalent; however, when a side edge of the second strip projects beyond the corresponding side edge of the first strip, the present invention provides marked advantages over the prior art as will appear.

With reference to FIG. 4, the trailing end of a relatively narrow strip S.1 is secured to the leading end of a relatively wide strip S.2 with the strip ends substantially centered with each other. Note that the strip S.2 thus has forwardly facing (that is, facing in the direction of strip travel) abrupt shoulders 27 which would interfere with subsequent travel of the strip through the processing line. In prior art designs, it has been necessary to trim away the abrupt shoulders by hand, as indicated by the dashed lines 28, prior to release of the joined strips for travel through the line.

In contrast and assuming strips like those seen in FIG. 4 are joined by the instant apparatus, the latter will trim off the abrupt shoulders 27 seen in FIG. 4 leaving only the tapered shoulders 29 seen in FIG. 5. On the other hand, if equal width strips like those seen in FIG. 3 are joined by the instant apparatus, the strip will be notched as seen in FIG. 3 with no adjustment of any kind to the apparatus. The means by which the present apparatus forms the notches N in the strip and the tapered shoulders 29 (FIG. 5) will next be described with particular reference to FIGS. 6, 7 and 8.

Figure 9:
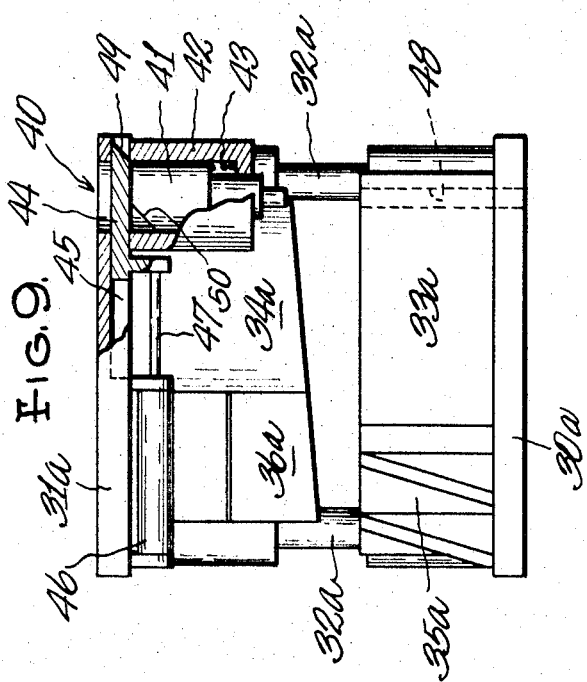

While the die set 22 seen in FIG. 7, 8 and 9, and next to be described in detail, is the die set on the left as viewed in FIG. 2, it is to be understood that an identical but mirror image die set 22 will be provided at the opposite side edge of the strip.

Die set 22 is conventional in so far that it is formed of a lower plate 30 and an upper plate 31 guided for movement toward and away from each other along guide rods 32. Such guide rods 32, however, are disposed at the die set portions spaced furthest from the longitudinal axis of the strip to allow the adjoining strip edge to be disposed between the die set upper and lower plates. While not shown, suitable die springs may resiliently urge the upper die plate 31 away from the lower die plate to the position illustrated in FIGS. 6 and 8.

Mounted on the lower die plate 30 is an arcuate knife member 33 cooperable with an arcuate knife member 34 carried by the upper die plate 31. Butted against the knife member 33 and carried by the lower die plate 30 is a rectilinear knife member 35 whose cutting edge is tangent to that of the arcuate knife member 33 (see especially FIG. 7). A similar knife member 36 is carried by the upper die plate 31 and is cooperable with the knife member 35. As viewed in FIG. 7, it will be noted that the cutting edges of knife members 35, 36 extend from their arcuate knife members in a direction opposite that of strip travel.

It will be recalled that when the strip is to be notched, it will be shifted longitudinally by the transfer carriage 19 to dispose its line of juncture W in the position seen in FIG. 7. In this view, the strip portions S.1 and S.2 are shown in phantom lines so as not to obscure the underlying die set. With the strip thus positioned and bearing in mind that the die set 22 is carried by its C-frame 20, the latter will be shifted edgewise of the strip from its normal position well outboard of the strip toward the latter to position the die set as seen in FIG. 7.

Interruption of C-frame and die set movement aforesaid may be effected in any suitable manner and herein shown, a limit switch 37 is carried by the knife member 33 and has an actuator 38 positioned for engagement with the adjoining side edge of the trailing end of the strip portion S.1. Accordingly, the die set will be shifted edgewise of and toward the strip until the actuator 38 engages the edge of strip S.1. With the die set thus positioned, the cylinder 23 will be actuated to lower the upper die set plate 31 sufficiently to effect cutting cooperation between the lower knife members 33, 35 and the upper knife members 34, 36 to thus cut the strip and form the notch N and the tapered shoulder 29 seen in FIG. 5. Of course, as will be clear, the opposite side edge of the strip will be cut at the same time but by the other die set 22.

Figure 11:
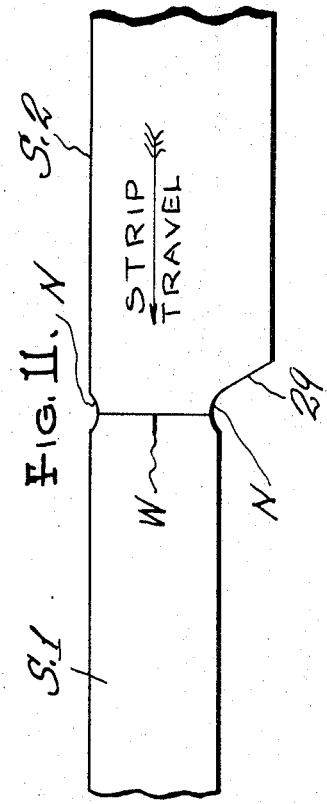

It will be understood that in the event the narrow strip end S.1 is not centered with the wide strip end S.2 when they are welded together but instead, the strip ends are welded together with one of their side edges aligned as seen in FIG. 11, the aligned strip edges will be engaged solely by the arcuate knife members and notched thereby while the opposite, nonaligned strip edges will be notched, as well as cut, to provide the tapered shoulder 29.

Certain strip-processing operations require identification of the line of juncture between the joined strips. This might be required to cause side guides to open, for example, or to permit the joined strip portion to be cut away. In any event, it has been found convenient to identify the line of strip juncture W by forming one or more small apertures 39 in the trailing end of the strip portion S.1 adjacent the line of juncture.

Figure 10:
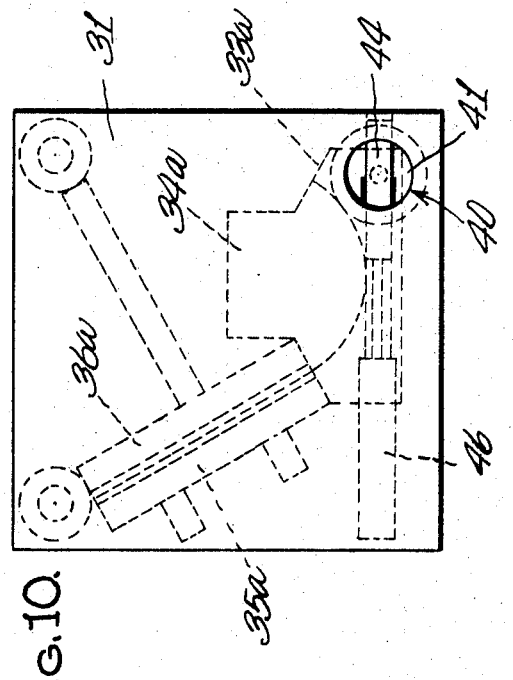

As seen in FIGS. 9 and 10, this may conveniently be done by incorporating a punch mechanism 40 in one of the die sets and, since the structure therein shown is similar to that previously described, corresponding parts are identified with the same reference characters as before but with the suffix "a" added.

Punch mechanism 40 is herein shown to comprise a punch 41 slidably disposed in a sleeve 42 secured to the underside of upper die plate 31a. A spring 43 yieldably urges punch 41 upwardly from the operating position seen in FIG. 9 and a slide 44 is slidable in a slot 45 in the upper die plate 31a and normally retains the punch in its operating position illustrated. A fluid cylinder 46 has its piston rod 47 secured to a depending boss on the slide 44 for effecting sliding movement thereof. Finally, the lower knife member 33a is apertured at 48 to closely receive the lower end of the punch 41.

With the parts positioned as seen in FIG. 9, the punch mechanism 40 will pierce a hole in the strip each time the upper die plate 31a is lowered to notch the strip. When, however, it is desired to notch the strip without piercing a hole therein, the punch mechanism is easily rendered inoperative in the following manner: Cylinder 46 will be actuated to shift slide 44 to the left until it is withdrawn from above the punch. When this is done, spring 43 will elevate the punch 41 sufficiently that it will not enter the aperture 48 when the upper die plate is lowered. When it is desired to render the punch mechanism operative once again, the cylinder 46 will return the slide 44 to the position illustrated, the inclined surfaces 49, 50 on the slide and punch respectively functioning to cam the punch to its illustrated operating position.

While only the punch 41 is shown mounted for selective disposition in operative or inoperative position, it is to be understood that a similar arrangement may be employed with the arcuate knife member 34a and/or the rectilinear knife member 36a when such an arrangement is desired.

We claim:

1. An apparatus for welding the trailing end of one strip to the leading end of another longitudinally aligned strip to enable the joined strips to be moved through a processing line in a predetermined direction, and wherein a side edge of said other strip extends beyond the corresponding side edge of said one strip to produce an abrupt overhanging corner which presents an extending generally right-angled shoulder that is undesirable in that it may interfere with subsequent working of the strip, the improvement comprising, die means positioned at an edge of the joined strip and having shear blades which cut an arcuate portion from the joined strips at the line of juncture and a rectilinear portion from said shoulder, said rectilinear portion being tangential to the rear part of said arcuate portion with respect to the line of strip movement and tapering from said rear part to the side edge of said other strip.